(12) United States Patent
Aepli et al.

(10) Patent No.: US 11,359,051 B2
(45) Date of Patent: *Jun. 14, 2022

(54) MICROWAVE-RESISTANT MOULDINGS

(71) Applicant: EMS-PATENT AG, Ems (CH)

(72) Inventors: Etienne Aepli, Ems (CH); Botho Hoffmann, Ems (CH); Thomas Wiedemann, Ems (CH)

(73) Assignee: EMS-Patent AG, Domat/Ems (CH)

( * ) Notice: Subject to any disclaimer, the term of this patent is extended or adjusted under 35 U.S.C. 154(b) by 12 days.

This patent is subject to a terminal disclaimer.

(21) Appl. No.: 15/910,877

(22) Filed: Mar. 2, 2018

(65) Prior Publication Data

US 2018/0251599 A1 Sep. 6, 2018

(30) Foreign Application Priority Data

Mar. 3, 2017 (EP) .................... 17159168

(51) Int. Cl.
  *C08G 69/26* (2006.01)
  *C08G 69/34* (2006.01)
  *C08L 77/08* (2006.01)
(52) U.S. Cl.
  CPC .......... *C08G 69/265* (2013.01); *C08G 69/34* (2013.01); *C08L 77/08* (2013.01)
(58) Field of Classification Search
  CPC ........ C08G 69/00; C08G 69/02; C08G 69/26; C08G 69/265; C08G 69/34; C08L 77/00;
  (Continued)

(56) References Cited

U.S. PATENT DOCUMENTS

| 4,740,377 A | 4/1988 | Dawes et al. |
| 5,104,945 A | 4/1992 | Eckel et al. |

(Continued)

FOREIGN PATENT DOCUMENTS

| DE | 39 13 114 A1 | 10/1990 |
| DE | 44 01 058 A1 | 6/1995 |

(Continued)

OTHER PUBLICATIONS

European Patent Office, Extended European Search Report in European Patent Application No. 17 15 9168.8 (dated Jun. 23, 2017).

(Continued)

*Primary Examiner* — Maria V Ewald
*Assistant Examiner* — Ethan A. Utt
(74) *Attorney, Agent, or Firm* — Leydig, Voit & Mayer, Ltd.

(57) ABSTRACT

The invention relates to microwave-resistant mouldings comprising at least one amorphous or microcrystalline copolyamide moulding compound, comprising at least one amorphous or microcrystalline copolyamide (A), said copolyamide (A) containing at least the following monomers: (a) at least one cycloaliphatic diamine, (b) 0.25 to 30 mol % of at least one dimeric fatty acid and (c) at least one aromatic dicarboxylic acid, where the proportions of all the monomers add up to 100 mol % and which has a glass transition temperature of at least 155° C. and a dielectric loss factor tan δ of not more than 8.30×10−3. The invention also relates to the use of an amorphous or microcrystalline copolyamide moulding compound comprising the copolyamide (A) for production of microwave-resistant mouldings.

20 Claims, 1 Drawing Sheet

(58) Field of Classification Search
CPC .. C08L 77/06; C08L 77/08; Y10T 428/31725;
Y10T 428/31765; Y10T 428/13; Y10T
428/1352; Y10T 428/1397; B32B 27/34;
B32B 2307/20; B32B 2307/204; B32B
2307/30; B32B 2377/00; B32B 1/00;
B32B 1/02; B65D 1/00; B65D 1/02;
B65D 1/0207; B65D 81/00; B65D 81/34;
B65D 81/3446; B65D 81/3453; B65D
2581/00; B65D 2581/34; B65D
2581/3437; B65D 2581/3486; B65D
2581/3487
USPC .............. 524/599, 606, 607, 612, 878, 879;
528/271, 363, 422; 428/474.4, 477.7,
428/34.1, 35.7, 36.92
See application file for complete search history.

(56) References Cited

U.S. PATENT DOCUMENTS

| | | | |
|---|---|---|---|
| 5,177,177 | A | 1/1993 | Thullen et al. |
| 8,383,244 | B2 | 2/2013 | Bayer et al. |
| 8,604,120 | B2 | 12/2013 | Stöppelmann et al. |
| 9,133,322 | B2 | 9/2015 | Roth et al. |
| 9,644,081 | B2 | 5/2017 | Aepli et al. |
| 9,663,655 | B2 | 5/2017 | Aepli et al. |
| 9,963,547 | B2 | 5/2018 | Hoppe et al. |
| 11,091,590 | B2 * | 8/2021 | Hoffmann ............... C08G 69/34 |
| 2002/0008113 | A1 | 1/2002 | Fujii et al. |
| 2010/0249307 | A1 * | 9/2010 | Stoppelmann .......... C08L 77/00 524/423 |
| 2012/0029133 | A1 | 2/2012 | Stöppelmann et al. |
| 2012/0175817 | A1 | 7/2012 | Becker et al. |
| 2012/0321829 | A1 | 12/2012 | Bayer et al. |
| 2014/0094548 | A1 | 4/2014 | Roth et al. |
| 2014/0171573 | A1 | 6/2014 | Bayer et al. |
| 2014/0296414 | A1 * | 10/2014 | Hattori ................... B29B 7/90 524/495 |
| 2015/0218374 | A1 | 8/2015 | Thomas et al. |
| 2015/0274935 | A1 * | 10/2015 | Hewel ................. A47J 31/3633 428/36.4 |
| 2015/0284531 | A1 | 10/2015 | Aepli et al. |
| 2015/0291795 | A1 | 10/2015 | Aepli et al. |
| 2015/0352765 | A1 * | 12/2015 | Hoffmann ............... B29C 45/78 528/324 |
| 2015/0368398 | A1 * | 12/2015 | Hoppe .................... B32B 5/024 528/346 |
| 2016/0130439 | A1 | 5/2016 | Koch et al. |
| 2016/0280914 | A1 | 9/2016 | Thomas et al. |
| 2017/0009017 | A1 | 1/2017 | Huang et al. |
| 2017/0183140 | A1 | 6/2017 | Sütterlin et al. |
| 2017/0298181 | A1 * | 10/2017 | Rulkens ................. C08G 69/30 |
| 2018/0100064 | A1 | 4/2018 | Aepli et al. |

FOREIGN PATENT DOCUMENTS

| | | | |
|---|---|---|---|
| DE | 199 10 948 A1 | 9/1999 | |
| EP | 0 469 435 A1 | 2/1992 | |
| EP | 2 298 830 A1 | 3/2011 | |
| JP | H04-253727 A | 9/1992 | |
| JP | 2016-020490 A | 2/2016 | |
| TW | I544031 B | 8/2016 | |
| WO | WO-2016050910 A1 * | 4/2016 | ............. C08G 69/26 |

OTHER PUBLICATIONS

European Patent Office, Notification under Article 94 (3) EPC issued in European Patent Application No. 17 159 168.8 (dated Apr. 7, 2020).
Intellectual Property Office, Taiwan, Republic of China, Notice of Examination in Taiwan Patent Application No. 107106199 (dated Jul. 9, 2021).
Ministry of Law and Human Rights, Republic of Indonesia, First Office Action in Indonesian Patent Application No. P00201801586 (dated Apr. 28, 2021).
Chinese National Intellectual Property Administration, First Office Action in Chinese Patent Application No. 201810180688.4 (dated Jun. 9, 2021).
National Office of Industrial Property, Office Action in Vietnamese Patent Application No. 1-2018-00881 (dated Jan. 5, 2022).
Japan Patent Office, Notification of Reasons for Refusal in Japanese Patent Application No. 2018-036228 (dated Nov. 16, 2021).
Chinese National Intellectual Property Administration, Second Office Action in Chinese Patent Application No. 201810180688.4 (dated Jan. 14, 2022).
Taiwan Intellectual Property Office, Examination Report in Taiwanese Patent Application No. 107106199 (dated Apr. 7, 2022).

* cited by examiner

FIG. 1A
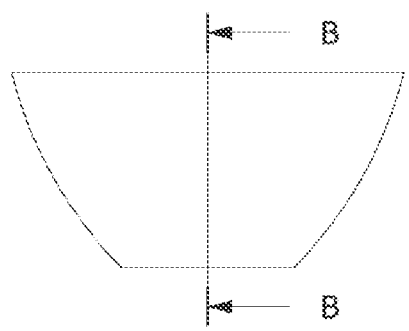
FIG. 1B
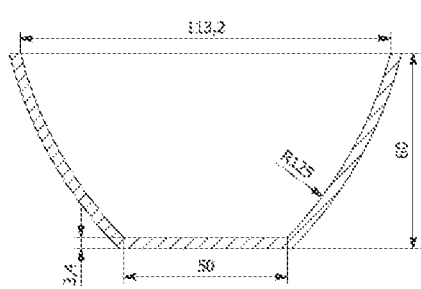
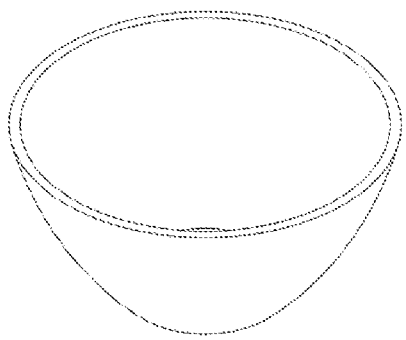
FIG. 1C
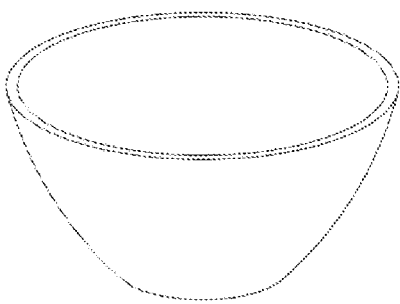
FIG. 1D

MICROWAVE-RESISTANT MOULDINGS

CROSS-REFERENCE TO RELATED APPLICATION

This patent application claims the benefit of European Patent Application No. 17 159 168.8, filed on Mar. 3, 2017, the disclosure of which is incorporated herein by reference in its entirety for all purposes.

BRIEF SUMMARY OF THE INVENTION

The present invention relates to microwave-resistant mouldings comprising at least one amorphous or microcrystalline polyamide moulding compound and to the use of an amorphous or microcrystalline copolyamide moulding compound for production of microwave-resistant mouldings.

BACKGROUND OF THE INVENTION

The prior art already describes some microwave-resistant polymer mouldings or moulding compounds.

DE 199 10 948 A1 relates to a thermally insulated synthetic resin vessel and to a thermally insulated synthetic resin lid. In the thermally insulated synthetic resin vessel, a thermally insulating layer is formed in the space between the inner vessel and the outer vessel, which comprise at least one synthetic resin selected from the group consisting of polyester, aromatic polyamide, polyketone, polyvinylidene fluoride, acrylonitrile-type resin and cycloolefin-type resin, wherein a gas having a lower thermal conductivity than air is enclosed therein. In the thermally insulating synthetic resin lid, there is likewise a thermally insulating layer formed in the space between the lower synthetic resin lid element and the upper synthetic resin lid element. The thermally insulating synthetic resin vessel and lid may consist of only one type of resin.

DE 3913114 A1 describes heat distortion-resistant thermoplastic moulding compounds composed of polycarbonates based on specific dihydroxydiphenylcycloalkanes and silicone rubbers, a process for production thereof and the use thereof for production of mouldings. The invention provides mixtures of a) 1% to 99% by weight, preferably 10% to 90% by weight, of specific polycarbonates based on dihydroxydiphenylcycloalkanes, b) 1% to 99% by weight, preferably 10% to 90% by weight, of other polycarbonates, especially those based on bisphenol A, and c) 1% to 95% by weight, preferably 2% to 60% by weight, especially 3% to 40% by weight, of silicone rubbers, especially silicone graft rubbers.

DE 4401058 A1 relates to moulding compounds comprising, as essential components, A) 1% to 50% by weight of polyarylene ethers in which at least 0.03% by weight of all end groups are hydroxyl end groups, B) 5% to 94% by weight of polyarylene ethers in which less than 0.03% by weight of all end groups are hydroxyl end groups, C) 5% to 94% by weight of polycarbonates, D) 0% to 50% by weight of fibrous or particulate fillers and E) 0% to 40% by weight of impact-modifying rubbers, F) 0% to 40% by weight of further additives, where components A to F add up to 100% by weight.

There has been no description to date of microwave-resistant mouldings based on amorphous or microcrystalline polyamide moulding compounds. However, there are known polyamide moulding compounds for other applications, for example injection mouldings having thin walls, stiff tubes, sheaths for optical fibres, parts of electrical or electronic components, housings or housing constituents.

EP 0469 435 A1 relates to amorphous copolyamides composed of a) 50 mol % of at least one cycloaliphatic diamine of the formula I

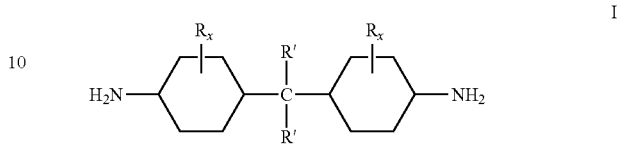

in which R is an alkyl radical having 1 to 10 carbon atoms, R' is hydrogen or an alkyl radical having 1 to 4 carbon atoms and x is 0 to 4, b) 5 to 25 mol % of a dimerized fatty acid, c) 25 to 45 mol % of at least one aromatic dicarboxylic acid, where the molar sum total of components a) to c) and is up to 100%, and optionally d) 0 to 50 mol %, based on the sum total of a), b) and c), of further polyamide-forming monomers. These copolyamides can easily be used, preferably by injection moulding processes, for production of mouldings which feature high stiffness and impact resistance, a high glass transition temperature and low absorption of moisture, especially for mouldings having thin walls; they can also be processed by extrusion to give stiff tubes or sheaths for optical fibres, for example. In the films sector, they can be processed in combination with other polymers, for example by coextrusion methods.

BRIEF SUMMARY OF THE INVENTION

Proceeding from this, the problem addressed by the present invention was that of providing microwave-resistant mouldings based on amorphous or microcrystalline polyamide moulding compounds which feature low heating under irradiation with microwaves and therefore remain dimensionally stable when used in a microwave oven.

This problem is solved by the features of the moulding described herein, comprising at least one amorphous or microcrystalline copolyamide moulding compound, said copolyamide moulding compound comprising at least one amorphous or microcrystalline copolyamide (A) containing at least the following monomers:
  (a) at least one cycloaliphatic diamine,
  (b) 0.25 to 30 mol % of at least one dimeric fatty acid and
  (c) at least one aromatic dicarboxylic acid, where
the proportions of all the monomers present in the copolyamide (A) add up to 100 mol % and which has a glass transition temperature of at least 155° C. and a dielectric loss factor tan δ of not more than $8.30 \times 10^{-3}$.

A further problem addressed by the present invention is that of providing amorphous or microcrystalline polyamide moulding compounds for use for the production of microwave-resistant mouldings.

This problem is solved through use of an amorphous or microcrystalline polyamide moulding compound comprising at least one amorphous or microcrystalline copolyamide (A) containing at least the following monomers:
  (a) at least one cycloaliphatic diamine,
  (b) 0.25 to 30 mol % of at least one dimeric fatty acid and
  (c) at least one aromatic dicarboxylic acid,
where the proportions of all the monomers present in the copolyamide (A) add up to 100 mol % and which has a glass transition temperature of at least 155° C. and a dielectric loss factor tan δ of not more than $8.30 \times 10^{-3}$, for the production of microwave-resistant mouldings.

Preferred embodiments and use according to the invention are also described.

BRIEF DESCRIPTION OF THE SEVERAL VIEWS OF THE DRAWING

FIG. 1A illustrates a view of a rotationally symmetric dish prepared from a moulding compound in accordance with an embodiment of the invention.

FIG. 1B illustrates another view of a rotationally symmetric dish prepared from a moulding compound in accordance with an embodiment of the invention.

FIG. 1C illustrates a further view of a rotationally symmetric dish prepared from a moulding compound in accordance with an embodiment of the invention.

FIG. 1D illustrates yet another view of a rotationally symmetric dish prepared from a moulding compound in accordance with an embodiment of the invention.

DETAILED DESCRIPTION OF THE INVENTION

Definitions of Terms

Dielectric Loss Factor

In the context of the present invention, the "dielectric loss factor" (=tan δ) of the complex relative permittivity (=$\varepsilon_r$) is understood to mean a measure of the energy which is converted to heat in a material within an electric alternating field and is thus lost from the field.

The "dielectric loss factor" (=tan δ) of the complex relative permittivity ($\varepsilon_r$) is defined according to IEC 60250-1 (1969) as $$\tan \delta = \varepsilon_r''/\varepsilon_r'$$

and the complex relative permittivity ($\varepsilon_r$) as $$\varepsilon_r = \varepsilon_r' - j\varepsilon_r''$$

where $\varepsilon_r''$ is the imaginary part of the complex relative permittivity $\varepsilon_r$, $\varepsilon_r'$ is the real part of the complex relative permittivity $\varepsilon_r$ and j is the imaginary unit.

Notations and Abbreviations for Polyamides and their Monomers

In the context of the present invention, the term "polyimide" (abbreviation: PA) is an umbrella term; this encompasses homopolyamides and copolyamides. The chosen notations and abbreviations for polyamides and their monomers correspond to those laid down in ISO Standard 1874-1 (2011, (D)). The abbreviations used therein are used synonymously hereinafter for the IUPAC names of the monomers. More particularly, the following abbreviations for monomers occur in the present application: MACM for bis(4-amino-3-methylcyclohexyl)methane (also referred to as 3,3'-dimethyl-4,4'-diaminodicyclohexylmethane, CAS No. 6864-37-5), TMDC for bis(4-amino-3,5-dimethylcyclohexyl)methane (also referred to as 3,3',5,5'-tetramethyl-4,4'-diaminodicyclohexylmethane, CAS No. 65962-45-0), PACM for bis(4-aminocyclohexyl)methane (also referred to as 4,4'-diaminodicyclohexylmethane, CAS No. 1761-71-3), T for terephthalic acid (CAS No. 100-21-0), I for isophthalic acid (CAS No. 121-95-5), 36 for dimeric fatty acid having 36 carbon atoms (CAS No. 68783-41-5 or 61788-89-4), 12 for dodecanedioic acid (also called decane-1,10-dicarboxylic acid, CAS No. 693-23-2), CHD for cyclohexane-1,4-dicarboxylic acid (CAS No. 1076-97-7) and 12 for laurolactam (CAS No. 947-04-6).

Amorphous or Microcrystalline Polyamides

Amorphous or microcrystalline polyamides, in differential scanning calorimetry (DSC) according to ISO 11357 (2013), at a heating rate of 20 K/min, preferably have a heat of fusion of not more than 50 J/g, more preferably of not more than 25 J/g, most preferably 0 to 22 J/g.

Microcrystalline polyamides are semicrystalline polyamides and therefore have a melting point. However, they have a morphology where the crystallites have such small dimensions that a plaque produced therefrom having a thickness of 2 mm is it still transparent, i.e. its transmission of light is at least 75%, measured according to ASTM D 1003-13 (2013).

In the microcrystalline polyamides used for the polyamide moulding compound according to the invention, the melting point measured according to ISO 11357 (2013) is preferably not more than 255° C.

Amorphous polyamides have a lower heat of fusion compared to the microcrystalline polyamides. The amorphous polyamides, in differential scanning calorimetry (DSC) according to ISO 11357 (2013), at a heating rate of 20 K/min, preferably have a heat of fusion of not more than 5 J/g, more preferably of not more than 3 J/g, most preferably of 0 to 1 J/g.

Amorphous polyamides do not have a melting point owing to their amorphicity.

The light transmittance of the amorphous or microcrystalline polyamides measured to ASTM D 1003-13 (2013) on plaques having a thickness of 2 mm is at least 75%, preferably at least 80% and more preferably at least 90%.

Copolyamide Moulding Compound

The copolyamide moulding compound according to the present invention is based on copolyamide A and preferably contains it to an extent of at least 90% by weight. However, the term "copolyamide moulding compound" should not be interpreted to the effect that no homopolyamides may be present in the moulding compound, but it is preferable that the moulding compound comprises exclusively copolyamides.

Dimeric Fatty Acid

In the context of the present invention, dimeric fatty acids (b) have at least 28 carbon atoms. They are obtained by dimerization of unsaturated monocarboxylic acids to give dicarboxylic acids, the dimerization preferably being conducted by catalytic means. Dimeric fatty acids, according to the present invention, are dicarboxylic acids.

Aliphatic Dicarboxylic Acid

The aliphatic dicarboxylic acids (d) in the context of the present invention are understood to mean dicarboxylic acids having 6 to 22 carbon atoms. These may be linear, branched or cycloaliphatic, and are in saturated form.

Figures of Amount for the Monomers

The copolyamides according to the invention contain solely dicarboxylic acids and diamines. The molar amounts thereof add up to 50 mol % for the sum total of all diamines and 50 mol % for the sum total of all dicarboxylic acids, and the sum total of the amounts of diamines and dicarboxylic acid is 100% for the copolyamide.

If polyamides, as well as dicarboxylic acids and diamines, also contain lactams or amino acids to an extent of X mol %, the sum total of all diamines is only (50−0.5X) mol % and the sum total of all dicarboxylic acids is (50−0.5X) mol %, and the sum total of the amounts of diamine and dicarboxylic acid is 100 mol % for the copolyamide.

In the figures of amount for the dicarboxylic acids and diamines in the copolyamides, the sum total of the molar amount of all diamines is essentially equal to the sum total of the molar amount of all dicarboxylic acids. "Essentially equal" means a maximum excess of the dicarboxylic acids or the diamines of 3%, meaning that the molar ratio of dicarboxylic acids to diamines is 1.03:1 to 1:1.03. Preference is given to a maximum excess of the dicarboxylic acids or the diamines of 2%, meaning that the molar ratio of dicarboxylic acids to diamines is 1.02:1 to 1:1.02. The excess serves to compensate for losses of monomer and/or to control the relative viscosity of the polyamide and hence the molar mass.

The figures of amount with regard to the monomers should be understood such that a corresponding molar ratio of these monomers used in the polycondensation is also reflected in the copolyamides prepared by polycondensation in this way.

General Details Relating to Figures of Amount

The copolyamide moulding compounds according to the present invention preferably contain solely components (A) and (B), the proviso being applicable that components (A) and (B) add up to 100% by weight. The fixed ranges for the figures of amount for the individual components (A) and (B) should be understood such that an arbitrary amount for each of the individual components may be selected within the specified ranges, provided that the strict proviso that the sum total of all components (A) to (B) is 100% by weight is fulfilled.

The figures of amount for the diamines and dicarboxylic acids present in the copolyamide (A) add up to 50 mol % in each case. All the monomers present in the copolyamide (A) add up to 100 mol %. The fixed ranges for the figures of amount for the individual monomers should be understood such that an arbitrary amount for each of the individual components may be selected within the specified ranges, provided that the strict proviso that the sum total of all the monomers present in the copolyamide (A) is 100% by weight is fulfilled.

Microwave-Resistant Mouldings

In a preferred embodiment of the present invention, the microwave-resistant moulding consists to an extent of more than 90% by weight, preferably to an extent of more than 95% by weight and more preferably to an extent of more than 98% by weight of the at least one amorphous or microcrystalline copolyamide moulding compound.

The other parts of the moulding may quite generally consist of any desired microwave-resistant materials. These materials are preferably selected from the group consisting of nylon-10,10, nylon-11, nylon-12, impact modifiers, cycloolefin copolymers or mixtures thereof. Alternatively, the moulding may consist exclusively of the amorphous or microcrystalline copolyamide moulding compound.

In a further embodiment of the present invention, the microwave-resistant moulding has a wall thickness in the range from 0.05 to 5.0 mm, preferably 0.1 to 4.5 mm and more preferably 1.0 to 4.0 mm.

The microwave-resistant mouldings are especially selected from the group consisting of articles such as dishware, vessels, containers, dishes, pots, cups, beakers, plates, lids, sauce boats, flasks or covering trays, undertrays or serving trays.

These articles can be used in the household, in gastronomy, in the laboratory and/or industry.

Copolyamide Moulding Compound

In the preferred embodiment of the present invention which follows, the amorphous or microcrystalline copolyamide moulding compound is specified in detail. These embodiments are preferred both for the moulding according to the invention and for the use according to the invention.

The at least one amorphous or microcrystalline copolyamide (A) contains at least the following monomers:
(a) at least one cycloaliphatic diamine;
(b) 0.25 to 30 mol % of at least one dimeric fatty acid; and
(c) at least one aromatic dicarboxylic acid; and optionally
(d) at least one aliphatic dicarboxylic acid.

The at least one cycloaliphatic diamine component (a), in a preferred embodiment, is selected from the group consisting of bis(4-amino-3-methylcyclohexyl)methane, bis(4-aminocyclohexyl)methane, bis(4-amino-3-ethylcyclohexyl)methane, bis(4-amino-3,5-dimethylcyclohexyl)methane, norbornane-2,6-diamine or 2,6-bis(aminomethyl)norbornane, 1,3-diaminocyclohexane, 1,4-diaminocyclohexane, isophoronediamine, 1,3-bis(aminomethyl)cyclohexane, 1,4-bis(aminomethyl)cyclohexane, 2,2-(4,4'-diaminodicyclohexyl)propane and mixtures thereof.

In a preferred embodiment of the present invention, the cycloaliphatic diamine (a) is present in the at least one amorphous or microcrystalline copolyamide (A) at 40 to 50 mol %, preferably at 48 to 50 mol % and especially preferably at exactly 50 mol %.

If less than 50 mol % of cycloaliphatic diamine is present in the copolyamide (A), the diamine component is made up to 50 mol % with 0 to 10 mol % and preferably with 0 to 2 mol % of at least one unbranched or branched linear aliphatic diamine e).

Preference is given to using amorphous copolyamides (A) for the copolyamide moulding compounds.

The dimeric fatty acid (b), in a preferred embodiment of the present invention, is a dimeric fatty acid having 36 or 44 carbon atoms, where the dimeric fatty acid (b) more preferably has 36 carbon atoms.

In a preferred embodiment of the present invention, the dimeric fatty acid (b) is present in the at least one amorphous or microcrystalline copolyamide (A) at 0.5 to 25 mol %, preferably at 1 to 20 mol % and especially preferably at 8 to 12 mol % or at 1.5 to 4.4 mol %.

The dimeric fatty acid (b) in the copolyamide (A) according to the invention preferably has an acid number in the range of 145-210 mg KOH/g, especially preferably in the range of 192-200 mg KOH/g. Its content of monofunctional acid is not more than 5%, its content of bifunctional acid at least 88%, and its content of trifunctional acid not more than 4%. The acid number, or the content of the various acids, is measured according to AOCS Te 1a-64 or AOCS Tf 5-91. Examples of useful products include those having 36 carbon atoms as obtainable under the Pripol brand name from Croda, especially Pripol 1013, 1012, 1009, 1006, or under the Empol brand name from Cognis, especially Empol 1012, 1016 or 1062, or under the Radiacid 0975 brand name from Oleon, or products having 44 carbon atoms, for example Pripol 1004 from Croda.

Preferably, the dimeric fatty acid (b) of the copolyamide (A) according to the invention is partly saturated, more preferably fully saturated.

The at least one aromatic dicarboxylic acid group (c), in a preferred embodiment of the present invention, is selected from the group consisting of isophthalic acid, terephthalic acid, naphthalenedicarboxylic acid and mixtures thereof.

In a preferred embodiment of the present invention, the at least one aromatic dicarboxylic acid (c) is present in the at least one amorphous or microcrystalline copolyamide (A) at 0.1 to 49.75 mol %, preferably at 0.5 to 49.5 mol %, more preferably at 10 to 49 mol % and especially preferably at 18 to 42 mol % or at 38 to 42 mol % or at 23.6 to 36.5 mol %.

In another preferred embodiment of the present invention, the at least one aliphatic dicarboxylic acid (d) is selected from the group consisting of hexane-1,6-dioic acid, nonane-1,9-dioic acid, decane-1,10-dioic acid, undecane-1,11-dioic acid, dodecane-1,12-dioic acid, tridecane-1,13-dioic acid, tetradecane-1,14-dioic acid, octadecane-1,18-dioic acid, cyclohexane-1,3-dicarboxylic acid, cyclohexane-1,4-dicarboxylic acid and mixtures thereof.

In a preferred embodiment of the present invention, the at least one aliphatic dicarboxylic acid (d) is present in the at least one amorphous or microcrystalline copolyamide (A) at 0 to 30 mol %, preferably at 0 to 25 mol % and especially preferably at 0 to 20 mol % or at 12 to 22 mol %.

In a further preferred embodiment of the present invention, the copolyamide (A) is selected from the group consisting of PA TMDCI/TMDCT/TMDC12/TMDC36, PA TMDCI/TMDCT/TMDC9/TMDC36, PA TMDCI/TMDC12/TMDC36, PA TMDCI/TMDC13/TMDC36, PA TMDCI/TMDC11/TMDC36, PA TMDCI/TMDC12/TMDCCHD/TMDC36, PA TMDCI/TMDC36, PA TMDCI/TMDC44 and mixtures thereof, where TMDC may be wholly or partly replaced by MACM.

In a particularly preferred embodiment of the present invention, the copolyamide (A) is selected from the group consisting of
PA TMDCI/TMDCT/TMDC12/TMDC36, PA TMDCI/TMDC12/TMDC36, PA MACMI/MACMT/MACM12/MACM36, PA MACMI/MACM12/MACM36 and mixtures thereof.

In a further particularly preferred embodiment of the present invention, the copolyamide (A) is selected from the group consisting of PA MACMI/MACM36, PA TMDCI/TMDC36 and mixtures thereof, where the molar ratio between the MACMI and MACM36 or TMDCI and TMD36 units is preferably in the range from 70:30 up to 95:5, more preferably in the range from 75:25 up to 90:10 and especially preferably from 80:20 to 85:15.

In a preferred embodiment of the present invention, the glass transition temperature of the at least one amorphous or microcrystalline copolyamide (A) is at least 170° C., especially preferably at least 180° C., more preferably at least 190° C. and most preferably at least 200° C., measured according to ISO 11357-2 and -3 (2013) on pellets having a water content below 0.1% by weight.

In a further preferred embodiment of the present invention, the dielectric loss factor tan δ of the at least one amorphous or thermoplastic copolyamide (A) is not more than $8.0 \times 10^{-3}$, preferably not more than $7.0 \times 10^{-3}$ and more preferably not more than $6.5 \times 10^{-3}$.

In a preferred embodiment of the present invention, the glass transition temperature of the at least one amorphous or microcrystalline copolyamide moulding compound is at least 155° C., preferably at least 170° C., especially preferably at least 180° C., more preferably at least 190° C. and most preferably at least 200° C., measured according to ISO 11357-2 and -3 (2013) on pellets having a water content below 0.1% by weight.

In a further preferred embodiment of the present invention, the dielectric loss factor tan δ of the at least one amorphous or thermoplastic copolyamide moulding compound (A) is not more than $8.3 \times 10^{-3}$, preferably not more than $8.0 \times 10^{-3}$, especially preferably not more than $7.0 \times 10^{-3}$ and more preferably not more than $6.5 \times 10^{-3}$.

In another preferred embodiment of the present invention, the at least one amorphous or microcrystalline copolyamide (A) comprises at least the following monomers:
(a) at least one cycloaliphatic diamine component selected from the group consisting of bis(4-amino-3-methylcyclohexyl)methane, bis(4-aminocyclohexyl)methane, bis(4-amino-3-ethylcyclohexyl)methane, bis(4-amino-3,5-dimethylcyclohexyl)methane, norbornane-2,6-diamine or 2,6-bis(aminomethyl)norbornane, 1,3-diaminocyclohexane, 1,4-diaminocyclohexane, isophoronediamine, 1,3-bis(aminomethyl)cyclohexane, 1,4-bis(aminomethyl)cyclohexane, 2,2-(4,4'-diaminodicyclohexyl)propane and mixtures thereof; and
(b) at least one dimeric fatty acid selected from the group consisting of dimeric fatty acids having 36 or 44 carbon atoms and mixtures thereof; and
(c) at least one aromatic dicarboxylic acid selected from the group consisting of isophthalic acid, terephthalic acid, naphthalenedicarboxylic acid and mixtures thereof; and optionally
(d) at least one aliphatic dicarboxylic acid selected from the group consisting of hexane-1,6-dioic acid, nonane-1,9-dioic acid, decane-1,10-dioic acid, undecane-1,11-dioic acid, dodecane-1,12-dioic acid, tridecane-1,13-dioic acid, tetradecane-1,14-dioic acid, octadecane-1,18-dioic acid, cyclohexane-1,3-dicarboxylic acid, cyclohexane-1,4-dicarboxylic acid and mixtures thereof.

In another preferred embodiment of the present invention, the at least one amorphous or microcrystalline copolyamide (A) comprises at least the following monomers:
(a) at least one cycloaliphatic diamine component selected from the group consisting of bis(4-amino-3-methylcyclohexyl)methane, bis(4-aminocyclohexyl)methane, bis(4-amino-3,5-dimethylcyclohexyl)methane and mixtures thereof and is preferably selected from the group consisting of bis(4-amino-3-methylcyclohexyl)methane, bis(4-amino-3,5-dimethylcyclohexyl)methane and mixtures thereof; and
(b) at least one dimeric fatty acid having 36 carbon atoms; and
(c) at least one aromatic dicarboxylic acid selected from the group consisting of isophthalic acid, terephthalic acid and mixtures thereof; and optionally
(d) at least one aliphatic dicarboxylic acid selected from the group consisting of dodecane-1,12-dioic acid, tetradecane-1,14-dioic acid, octadecane-1,18-dioic acid and mixtures thereof.

In an especially preferred embodiment of the present invention, the at least one amorphous or microcrystalline copolyamide (A) comprises at least the following monomers:
(a) 40 to 50 mol %, preferably 48 to 50 mol % and especially preferably exactly 50 mol % of at least one cycloaliphatic diamine;
(b) 8 to 12 mol % of at least one dimeric fatty acid; and
(c) 18 to 42 mol % of at least one aromatic dicarboxylic acid;
(d) 0 to 20 mol % of at least one aliphatic dicarboxylic acid; where
the proportions of all the monomers present in the copolyamide (A) add up to 100 mol %.

In another especially preferred embodiment of the present invention, the at least one amorphous or microcrystalline copolyamide (A) comprises at least the following monomers:

(a) 40 to 50 mol %, preferably 48 to 50 mol % and especially preferably exactly 50 mol % of at least one cycloaliphatic diamine;
(b) 1.5 to 4.4 mol % of at least one dimeric fatty acid; and
(c) 23.6 to 36.5 mol % of at least one aromatic dicarboxylic acid;
(d) 12 to 22 mol % of at least one aliphatic dicarboxylic acid; where the proportions of all the monomers present in the copolyamide (A) add up to 100 mol %.

In a further especially preferred embodiment of the present invention, the at least one amorphous or microcrystalline copolyamide (A) comprises at least the following monomers:
(a) 40 to 50 mol %, preferably 48 to 50 mol % and especially preferably exactly 50 mol % of at least one cycloaliphatic diamine;
(b) 8 to 12 mol % of at least one dimeric fatty acid; and
(c) 38 to 42 mol % of at least one aromatic dicarboxylic acid; where the proportions of all the monomers present in the copolyamide (A) add up to 100 mol %.

In one embodiment, the copolyamide does not contain any monomers apart from the monomers (a) to (e).

In a further preferred embodiment of the present invention, the copolyamide moulding composition (B) comprises additives preferably selected from the group consisting of inorganic and organic stabilizers, especially antioxidants, antiozonants and light stabilizers, condensation catalysts, chain regulators, lubricants, demoulding agents, separating agents, chain-extending additives, dyes, markers, inorganic pigments, organic pigments, optical brighteners, natural sheet silicate, synthetic sheet silicate, nanoscale fillers having a maximum particle size of 100 nm.

A preferred copolyamide moulding compound of the present invention has the following composition:
90% to 100% by weight, preferably 95% to 99.99% by weight and more preferably 98.0 to 99.9% by weight of copolyamide (A), and
0% to 10% by weight, preferably 0.01% to 5% by weight and more preferably 0.1 to 2.0% by weight of additives (B), where components (A) and (B) add up to 100% by weight.

In another preferred embodiment of the present invention, the light transmittance of the at least one amorphous or microcrystalline copolyamide (A) measured according to ASTM D 1003-13 (2013) on a plaque having a thickness of 2 mm produced therefrom is still at least 75%, preferably at least 80% and more preferably at least 90%.

In another preferred embodiment of the present invention, the light transmittance of the at least one amorphous or microcrystalline copolyamide moulding compound measured according to ASTM D 1003-13 (2013) on a plaque having a thickness of 2 mm produced therefrom is at least 75%, preferably at least 80% and more preferably at least 90%.

The relative viscosity of the amorphous or microcrystalline copolyamides (A), in a preferred embodiment of the present invention, is 1.34 to 2.00, preferably 1.35 to 1.80, more preferably 1.36 to 1.65 or 1.45 to 1.80, measured in a solution of 0.5 g of polyamide in 100 ml of m-cresol at 20° C.

In another preferred embodiment of the present invention, mouldings formed from the amorphous or microcrystalline copolyamides (A) have very good mechanical properties, especially high impact resistances. The notched impact resistance determined according to ISO 179/2 at 23° C. is preferably >4 kJ/m$^2$, more preferably >8 kJ/m$^2$, especially preferably >10 kJ/m$^2$. The impact resistance determined according to ISO 179/2 at 23° C. is preferably >100 kJ/m$^2$, more preferably >250 kJ/m$^2$, especially preferably >300 kJ/m$^2$.

Uses of Amorphous or Microcrystalline Copolyamide Moulding Compounds

The invention further relates to the use of a copolyamide moulding compound composed of an amorphous or microcrystalline copolyamide, wherein the at least one amorphous or microcrystalline copolyamide (A) contains at least the following monomers:
(a) a cycloaliphatic diamine,
(b) 0.25 to 30 mol % of at least one dimeric fatty acid and
(c) at least one aromatic dicarboxylic acid, where the proportions of all the monomers present in the copolyamide (A) add up to 100 mol % and which has a glass transition temperature of at least 155° C. and a dielectric loss factor tan δ of not more than $8.0 \times 10^{-3}$, for production of microwave-resistant mouldings.

A preferred embodiment of the present invention relates to the use of the at least one amorphous or microcrystalline copolyamide moulding compound for production of microwave-resistant mouldings consisting of the at least one amorphous or microcrystalline copolyamide to an extent of more than 90% by weight, preferably to an extent of more than 95% by weight and more preferably to an extent of more than 98% by weight.

The other parts of the moulding may quite generally consist of any desired microwave-resistant materials. These materials are preferably selected from the group consisting of nylon-10,10, nylon-11, nylon-12, impact modifiers, cycloolefin copolymers or mixtures thereof. Alternatively, the moulding may consist exclusively of the amorphous or microcrystalline copolyamide moulding compound.

The copolyamide moulding compound has the features as specified above.

Another preferred embodiment of the present invention relates to the use of the amorphous or microcrystalline copolyamide moulding compound for production of microwave-resistant mouldings selected from the group consisting of articles such as dishware, vessels, containers, dishes, pots, cups, beakers, plates, lids, sauce boats, flasks or covering trays, undertrays or serving trays. These articles can be used in the household, in gastronomy, in the laboratory and/or industry.

General Method for Preparation of the Amorphous or Microcrystalline Copolyamides The amorphous or microcrystalline copolyamides are prepared in a manner known per se, for example in standard commercial, stirrable pressure autoclaves having a reservoir vessel and a reaction vessel.

The reservoir vessel is initially charged with deionized water, and the monomers and any additives are added. This is followed by repeated inertization with nitrogen gas. The mixture is heated up to 180 to 230° C. while stirring under the pressure which is established in order to obtain a homogeneous solution. This solution is pumped through a sieve into the reaction vessel, where it is heated up to the desired reaction temperature of 260 to 340° C. at a pressure of not more than 30 bar. The mixture is kept at the reaction temperature in the pressure phase for 2 to 4 hours. In the subsequent expansion phase, the pressure is reduced to atmospheric pressure within 1 to 2 hours, in the course of which the temperature can fall slightly. In the subsequent degassing phase, the mixture is kept at a temperature of 270 to 340° C. at atmospheric pressure for 0.5 to 2.5 hours. The polymer melt is discharged in strand form, cooled down in a water bath at 15 to 80° C. and pelletized. The pelletized material is dried at 80 to 120° C. under nitrogen or under reduced pressure to a water content of less than 0.1% by weight.

Suitable catalysts for acceleration of the polycondensation reaction are phosphorus acids, for example $H_3PO_2$, $H_3PO_3$, $H_3PO_4$, salts thereof or organic derivatives. The catalysts are added in the range from 0.01% to 0.5% by weight, preferably 0.03% to 0.1% by weight, based on the polyamide.

Suitable defoamers for avoidance of foam formation during the degassing are aqueous 10% emulsions which contain silicones or silicone derivatives and are used in amounts of 0.01% to 1.0% by weight, preferably 0.01% to 0.10% by weight, based on the polyamide.

The relative viscosity and hence the molar mass can be adjusted in a manner known per se, for example via monofunctional amines or carboxylic acids and/or difunctional diamines and dicarboxylic acids as chain transfer agents. Preferred monofunctional chain transfer agents for the copolyamides according to the invention are benzoic acid, acetic acid, propionic acid, butyric acid, valeric acid, caproic acid, lauric acid, stearic acid, 2-ethylhexanoic acid, cyclohexanoic acid, propylamine, butylamine, pentylamine, hexylamine, 2-ethylhexylamine, n-octylamine, n-nonylamine, n-dodecylamine, n-tetradecylamine, n-hexadecylamine, stearylamine, cyclohexylamine, 3-(cyclohexylamino)propylamine, methylcyclohexylamine, dimethylcyclohexylamine, benzylamine, 2-phenylethylamine, aniline or triacetonediamine. The chain transfer agents can be used individually or in combination. It is also possible to use other monofunctional compounds that can react with an amino or acid group as chain transfer agents, such as anhydrides, isocyanates, acid halides, amides or esters. The customary use amount for the monofunctional chain transfer agents is 8 to 200 mmol per kg of copolyamide.

The glass transition temperature (Tg) of the amorphous or microcrystalline copolyamides (A) is at least 155° C., preferably 170 to 235° C., especially preferably 180 to 230° C., more preferably 190 to 225° C. and most preferably 200 to 220° C., measured according to ISO 11357-2 and -3 (2013) on pellets having a water content below 0.1% by weight.

Production of the Microwave-Resistant Mouldings

The microwave-resistant mouldings can be produced via the standard processing techniques for polyamide moulding compounds. Particular preference is given to processing via injection moulding techniques.

The processing of the amorphous or microcrystalline copolyamides by injection moulding is effected in conventional injection moulding machines having a standard 3-zone screw at barrel temperatures of 250 to 340° C., and a temperature below 100° C. may also be chosen for the intake and a temperature profile that rises and ascends from the intake to the nozzle may be used. The mould temperature is set to 120 to 180° C., preferably 140 to 170° C.

The examples which follow are intended to elucidate the subject-matter of the invention in detail, without wishing to restrict it to the specific embodiments shown here.

1 Test Methods

In the context of this application, the following test methods were used:

Relative Viscosity

Relative viscosity was determined according to ISO 307 (2007) at 20° C. For this purpose, 0.5 g of polymer pellets was weighed out in 100 ml of m-cresol, and the relative viscosity (RV) was calculated as $RV=t/t_0$ in accordance with Section 11 of the standard.

Glass Transition Temperature (Tg)

Glass transition temperature was determined according to ISO 11357-2 and -3(2013) on pellets having a water content below 0.1% by weight.

Differential scanning calorimetry (DSC) was conducted at a heating rate of 20 K/min in each of the two heating runs. After the first heating run, the sample was quenched in dry ice. The glass transition temperature (Tg) was determined in the second heating run. The midpoint of the glass transition region which was reported as the glass transition temperature (Tg) was determined by the "half-height" method.

Light Transmittance

Light transmittance was determined at 23° C. according to ASTM D 1003-13 (2013) on 60×60 mm plaques (length× width) of thickness 2 mm with a film gate in a "Haze Gard plus" from Byk Gardner with CIE illuminant C. The light transmittance value was reported in % of the quantity of incident light.

Dielectric Loss Factor

The dielectric loss factor tan δ is measured according to IEC 61189-2-721 (2015) on 80×80×3 mm plaques with a film gate using a split post dielectric resonator (SPDR) from QWED, Poland, and the driver software Microwave Q-Meter 1.5.11 (brochure including information relating to measurement available at www.qwed.eu). The measurement frequency is 2.45 GHz, the measurement temperature 23° C.

Microwave Oven Test

The microwave oven test was conducted on rice dishes, the production of which is described under 3.2. These rice dishes were stored in water at 95° C. for 14 days, removed directly before the test, dried with a cotton cloth and positioned unfilled in the middle of the base area of the cooking space of a microwave oven. The microwave used was the commercial Samsung CM1919A microwave, which does not need a turntable. The maximum power of the microwave is 1850 watts. The operating frequency is 2.45 GHz. The cooking space has the dimensions 370×370×190 mm (width×depth×height). After the door had been closed, the microwave oven was started immediately, using the maximum power of 1850 watts.

After 120 seconds had passed, the rice dish was removed and examined visually for damage such as warpage, partly molten sites or blister formation. Five dishes were tested in each case; if damage occurred in just one of the dishes, the test was considered to have been failed.

Of rice dishes made from materials that passed the 120 s microwave test, a further 5 dishes were tested in some cases, measuring the time before the first damage such as warpage, partly molten sites or blister formation was apparent through the window of the microwave oven. The arithmetic mean from the 5 times measured was reported.

Tensile Modulus of Elasticity

ISO 527 with a pulling speed of 1 mm/min

ISO tensile specimen, standard: ISO/CD 3167, A1 type, 170×20/10×4 mm, temperature: 23° C.

Breaking Strength and Elongation at Break

The determination of breaking strength and elongation at break was conducted according to ISO 527 at 23° C. with a pulling speed of 5 mm/min in the case of reinforced materials using an ISO tensile specimen (mass 170×20/10×4 mm), produced according to the standard ISO/CD 3167.

Charpy Impact Resistance

The determination of Charpy impact resistance was conducted according to ISO 179/2*eU (* 2=instrumented) at 23° C. using an ISO test specimen, B1 type (mass 80×10×4 mm), produced according to the standard ISO/CD 3167.

Charpy Notched Impact Resistance

Charpy notched impact resistance was conducted according to ISO 179/2*eA (* 2=instrumented) at 23° C. using an ISO test specimen, B1 type (mass 80×10×4 mm), produced according to the standard ISO/CD 3167.

2 Starting Materials

TABLE 1

Monomers used in the examples and comparative examples

| Monomer | CAS No. | Melting range [° C.] | Trade name | Manufacturer/ supplier |
|---|---|---|---|---|
| Bis(4-amino-3,5-dimethylcyclohexyl)methane | 65962-45-0 | — | — | BASF SE, Germany |
| Bis(4-amino-3-methylcyclohexyl)methane | 6864-37-5 | −7 to −0.6* | Laromin C260 | BASF SE, Germany |
| Dimeric fatty acid C36 | 68783-41-5 | — | Radiacid 0975 | OLEON N.V., Belgium |
| Terephthalic acid | 100-21-0 | >400 | — | GMS - Chemie-Handelsges.m.b.H., Germany |
| Isophthalic acid | 121-91-5 | 345 to 348 | — | Flint Hills Resources, Switzerland |
| Nonane-1,9-dioic acid | 123-99-9 | 101 to 102 | — | Emery Oleochemicals GmbH, Germany |
| Undecane-1,11-dioic acid | 1852-04-6 | 113 to 114 | — | Cathay Biotechnology Ltd., China |
| Dodecane-1,12-dioic acid | 693-23-2 | 128 to 130 | — | Cathay Biotechnology Ltd., China |
| Tridecane-1,13-dioic acid | 505-52-2 | 113 to 116 | — | Cathay Biotechnology Ltd., China |
| Cyclohexane-1,4-dicarboxylic acid | 1076-97-7 | 163 to 169 | — | Eastman Chemicals Company, USA |
| Laurolactam | 947-97-7 | 149 to 169 | — | EMS-CHEMIE AG, Switzerland |

*freezing range according to ASTM D1015-55.

3 Examples and Comparative Examples 3.1 Preparation of the Copolyamide According to Examples 1 and 9

There follows an elucidation of a copolyamide according to the invention using the PA TMDCI/TMDCT/TMDC12/TMDC36 used in Example 1:

The charge vessel of a 300 l pressure autoclave was initially charged with 30 kg of deionized water, and 6.82 kg of isophthalic acid, 6.82 kg of terephthalic acid, 13.51 kg of dodecane-1,12-dicarboxylic acid and 3.30 kg of dimeric fatty acid (Radiacid 0975 with 36 carbon atoms) were stirred in. Thereafter, 39.54 kg of bis(4-amino-3,5-dimethylcyclohexyl)methane (TMDC), 20 g of Antifoam RD 10% by weight emulsion as defoamer and, finally, 80 g of benzoic acid as chain transfer agent were added. The procedure thereafter was as follows:

After inertization 10 times, the mixture was heated up to 210° C. The homogeneous solution was pumped through a sieve into the reaction vessel at 210° C.

While stirring, the mixture was heated up to 305° C. therein and kept in the pressure phase at 20 bar for 5 hours. Within 1.5 hours, the mixture was expanded to atmospheric pressure and then degassed at 305° C. for 1 hour.

The polymer melt was discharged, cooled down in a water bath (20° C.) and pelletized. The pelletized material was dried to a water content of below 0.1% by weight at 100° C. under reduced pressure (30 mbar).

The relative viscosity of the product was 1.53, the glass transition temperature was 212° C. and the light transmittance at 2 mm was 92.9%.

There follows an elucidation of a copolyamide according to the invention using the PA TMDCI/TMDC36 used in Example 9:

The charge vessel of a 300 l pressure autoclave was initially charged with 30 kg of deionized water, and 18.52 kg of isophthalic acid and 14.49 kg of dimeric fatty acid (Radiacid 0975 with 36 carbon atoms) were stirred in. Thereafter, 36.99 kg of bis(4-amino-3,5-dimethylcyclohexyl)methane (TMDC), 20 g of Antifoam RD 10% by weight emulsion as defoamer and, finally, 140 g of benzoic acid as chain transfer agent were added. The procedure thereafter was as follows:

After inertization 10 times, the mixture was heated up to 210° C. The homogeneous solution was pumped through a sieve into the reaction vessel at 210° C.

While stirring, the mixture was heated up to 305° C. therein and kept in the pressure phase at 20 bar for 5 hours. Within 1.5 hours, the mixture was expanded to atmospheric pressure and then degassed at 305° C. for 1 hour.

The polymer melt was discharged, cooled down in a water bath (20° C.) and pelletized. The pelletized material was dried to a water content of below 0.1% by weight at 100° C. under reduced pressure (30 mbar).

The relative viscosity of the product was 1.39, the glass transition temperature was 206° C. and the light transmittance at 2 mm was 92.8%.

3.2 Production of the Test Specimens

Rice Dishes

The rice dishes were produced in an injection moulding machine from Ferromatik Milacron, model: K85D-S/2F, with a 40 mm standard 3-zone screw. Ascending barrel temperatures of 280 to 325° C. and an intake temperature of 40° C. were set. The mould temperature was set to 160° C.

The dimensions of the rotationally symmetric dish (see FIG. 1) are:
Internal diameter at the top: 113.2 mm
Internal diameter at the bottom: 50 mm
Radius: 125 mm
Height: 60 mm
Wall thickness: 3.4 mm Plaques The 80×80×3 mm plaques with film gate were produced in an injection moulding machine from Arburg, model: Allrounder 420 C 1000-250 with a 25 mm standard 3-zone screw. From the intake to the nozzle, ascending and descending barrel temperatures of 310/320/325/325/315/305° C. were used. The mould temperature was set to 160° C.

The 60×60×2 mm plaques with film gate for determination of light transmittance were produced as described above, except using a polished mould.

The plaques were used in the dry state; for this purpose, they were stored in a dry environment, i.e. over silica gel, at room temperature for at least 48 h after injection moulding.

3.3 Results

Table 2 below shows Examples 1 to 10.

TABLE 2

| | | Examples | | | | | | | | | |
|---|---|---|---|---|---|---|---|---|---|---|---|
| | Unit | 1 | 2 | 3 | 4 | 5 | 6 | 7 | 8 | 9 | 10 |
| Monomers | | | | | | | | | | | |
| TMDC | mol % | 50 | 50 | — | — | — | — | — | — | 50 | — |
| MACM | mol % | — | — | 50 | 50 | 50 | 50 | 50 | 50 | — | 50 |
| Dimeric fatty acid C36 | mol % | 2 | 2 | 2 | 2 | 2 | 2 | 2 | 4 | 9.5 | 9.5 |
| Isophthalic acid | mol % | 14 | 28 | 14 | 28 | 28 | 14 | 14 | 14 | 40.5 | 40.5 |
| Terephthalic acid | mol % | 14 | — | 14 | — | — | 14 | — | 14 | — | — |
| Dodecane-1,12-dioic acid | mol % | 20 | — | 20 | 20 | — | — | 20 | 18 | — | — |
| Tridecane-1,13-dioic acid | mol % | — | 20 | — | — | — | — | — | — | — | — |
| Undecane-1,11-dioic acid | mol % | — | — | — | — | 20 | — | — | — | — | — |
| Nonane-1,9-dioic acid | mol % | — | — | — | — | — | 20 | — | — | — | — |
| Cyclohexane-1,4-dicarboxylic acid | mol % | — | — | — | — | — | — | 14 | — | — | — |
| Measured values | | | | | | | | | | | |
| Relative viscosity (RV)* | — | 1.53 | 1.50 | 1.61 | 1.53 | 1.53 | 1.53 | 1.61 | 1.53 | 1.38 | 1.37 |
| Glass transition temperature | ° C. | 212 | 206 | 206 | 198 | 201 | 207 | 195 | 195 | 206 | 195 |
| Dielectric loss factor tan δ | $[10^{-3}]$ | 6.45 | 6.67 | 8.15 | 7.98 | 8.15 | 7.93 | 8.11 | 7.75 | 4.38 | 6.20 |
| Light transmittance 2 mm | % | 92.9 | n.d. | 92.8 | n.d. | n.d. | n.d. | 93.2 | n.d. | 92.8 | 93.3 |
| Microwave oven test | 120 s | + | + | + | + | + | + | + | + | + | + |
| | s | n.a. | n.a. | 170 | n.a. | n.a. | n.a. | n.a. | n.a. | 222 | 130 |

*RV relative viscosity, measured on a solution of 0.5 g of polyamide in 100 ml of m-cresol at 20 C.,
+ = passed,
n.a. = not available (≥120 s),
n.d. = not determined Table 3 below shows Comparative Examples 11 to 15.

TABLE 3

| | | Comparative Examples | | | | |
|---|---|---|---|---|---|---|
| | Unit | 11 | 12 | 13 | 14 | 15 |
| Monomers | | | | | | |
| TMDC | mol % | — | — | — | — | — |
| MACM | mol % | 37.5 | 50 | 50 | 50 | 38 |
| Dimeric fatty acid C36 | mol % | — | — | — | 50 | — |
| Isophthalic acid | mol % | 37.5 | — | 13.5 | — | 19 |
| Terephthalic acid | mol % | — | — | 13.5 | — | 19 |
| Dodecane-1,12-dioic acid | mol % | — | 50 | 23 | — | — |
| Laurolactam | mol % | 25 | — | — | — | 24 |
| Measured values | | | | | | |
| Relative viscosity (RV)* | — | 1.56 | 1.70 | 1.54 | 1.54 | 1.53 |
| Glass transition temperature | ° C. | 213 | 155 | 204 | 76 | 194 |

TABLE 3-continued

Comparative Examples.

| | | Comparative Examples | | | | |
|---|---|---|---|---|---|---|
| | Unit | 11 | 12 | 13 | 14 | 15 |
| Dielectric loss factor tan δ | [10⁻³] | 8.91- | 9.26 | 8.54 | 4.50 | 10.20 |
| Light transmittance 2 mm | % | 93.3- | 93.9 | 93.3 | 93.1 | 93.3 |
| Microwave oven test | 120 s | failed | failed | failed | ** | failed |
| | s | — | — | — | — | — |

*RV relative viscosity, measured on a solution of 0.5 g of polyamide in 100 ml of m-cresol at 20° C.
** already deforms in the conditioning step (14 days at 95° C. in water)

Table 4 below shows the mechanical properties of the copolyamides of Examples 3, 9 and 10.

TABLE 4

Mechanical properties of the copolyamides of Examples 3, 9 and 10.

| | | Examples | | |
|---|---|---|---|---|
| | Unit | 3 | 9 | 10 |
| Monomers | | | | |
| TMDC | mol % | — | 50 | — |
| MACM | mol % | 50 | — | 50 |
| Dimeric fatty acid C36 | mol % | 2 | 9.5 | 9.5 |
| Isophthalic acid | mol % | 14 | 40.5 | 40.5 |
| Terephthalic acid | mol % | 14 | — | — |
| Dodecane-1,12-dioic acid | mol % | 20 | — | — |
| Measured values | | | | |
| Relative viscosity (RV)* | — | 1.61 | 1.38 | 1.37 |
| Tensile modulus of elasticity | MPa | 2150 | 2380 | 2270 |
| Breaking strength | MPa | 64 | 87 | 70 |
| Elongation at break | % | 57 | 7 | 14 |
| Charpy impact resistance 23° C. | kJ/m² | 342 | 105 | 312 |
| Charpy notched impact resistance 23° C. | kJ/m² | 11 | 5 | 5 |

*RV relative viscosity, measured on a solution of 0.5 g of polyamide in 100 ml of m-cresol at 20° C.

4 Discussion of Results

It can be seen from Table 2 that the mouldings according to Inventive Examples 1 to 10 have passed the microwave oven test. The mouldings according to Comparative Examples 11 to 15, by contrast, as shown by Table 3, are found to be unsuitable for use in microwaves.

It was found that, completely surprisingly, mouldings likewise based on amorphous polyamide moulding compounds which have glass transition temperatures of even more than 200° C. (see Comparative Examples 11 and 13, Table 3), i.e. a glass transition temperature above that of Inventive Examples 4, 7, 8 and 10, were also unable to pass the microwave test. The moulding compound from which the moulding from Comparative Example 13 was produced has a dielectric loss factor greater than 8.30×10⁻³. However, a low dielectric loss factor on its own is likewise insufficient to pass the microwave test (see Comparative Example 14, dielectric loss factor of 4.50×10⁻³). Only the moulding compounds having the specific combination of features of the present invention, i.e. a glass transition temperature of >155° C. with a dielectric loss factor ban δ of less than 8.30×10⁻³, allow production of mouldings that pass the microwave oven test.

The invention claimed is:

1. A microwave-resistant moulding comprising a microwave-resistant moulding compound comprising at least one amorphous or microcrystalline copolyamide (A) comprising at least the following monomers:
    (a) at least one cycloaliphatic diamine;
    (b) 1.5 to 4.4 mol % of at least one dimeric fatty acid; and
    (c) at least one aromatic dicarboxylic acid; and optionally 0 to 30 mol % of aliphatic dicarboxylic acid (d);
    wherein the proportions of all of the monomers add up to 100 mol %, and
    which has a glass transition temperature of at least 155° C. and a dielectric loss factor tan δ of not more than 8.30×10⁻³.
    wherein the microwave-resistant moulding is selected from the group consisting of dishware, dishes, pots, cups, beakers, plates, lids, sauce boats, covering trays, undertrays, and serving trays.

2. The microwave-resistant moulding compound according to claim 1, wherein the glass transition temperature of the amorphous or microcrystalline copolyamide is at least 170° C.

3. The microwave-resistant moulding according to claim 1, wherein the dielectric loss factor tan δ of the at least one amorphous or microcrystalline copolyamide (A) is not more than 8.0×10⁻³.

4. The microwave-resistant moulding compound according to claim 1, which comprises at least the following monomers:
    40 to 50 mol % of cycloaliphatic diamine (a); and
    1.5 to 4.4 mol % of dimeric fatty acid (b); and
    0.1 to 49.75 mol % of aromatic dicarboxylic acid (c); and optionally
    0 to 30 mol % of aliphatic dicarboxylic acid (d);
    where the proportions of all of the monomers add up to 100 mol %.

5. The microwave-resistant moulding according to claim 1, wherein the at least one amorphous or microcrystalline copolyamide (A) contains at least the following monomers:
    (a) at least one cycloaliphatic diamine component selected from the group consisting of bis(4-amino-3-methylcyclohexyl)methane, bis(4-aminocyclohexyl)methane, bis(4-amino-3-ethylcyclohexyl)methane, bis(4-amino-3,5-dimethylcyclohexyl)methane, norbornane-2,6-diamine or 2,6-bis(aminomethyl)norbornane, 1,3-diaminocyclohexane, 1,4-diaminocyclohexane, isophoronediamine, 1,3-bis(aminomethyl)cyclohexane, 1,4-bis(aminomethyl)cyclohexane, 2,2-(4,4'-diaminodicyclohexyl)propane and mixtures thereof; and
    (b) at least one dimeric fatty acid selected from the group consisting of dimeric fatty acids having 36 or 44 carbon atoms and mixtures thereof; and (c) at least one aromatic dicarboxylic acid selected from the group consisting of isophthalic acid, terephthalic acid, naphthalenedicarboxylic acid, and mixtures thereof; and optionally (d) at least one aliphatic dicarboxylic acid selected from the group consisting of hexane-1,6-dioic acid, nonane-1,9-dioic acid, decane-1,10-dioic acid, undecane-1,11-dioic acid, dodecane-1,12-dioic acid, tridecane-1,13-dioic acid, tetradecane-1,14-dioic acid, octadecane-1,18-dioic acid, cyclohexane-1,3-dicarboxylic acid, cyclohexane-1,4-dicarboxylic acid, and mixtures thereof.

6. The microwave-resistant moulding compound according to claim 1, wherein the at least one amorphous or microcrystalline copolyamide (A) contains at least the following monomers:

(a) at least one cycloaliphatic diamine component selected from the group consisting of bis(4-amino-3-methylcyclohexyl)methane, bis(4-aminocyclohexyl)methane, bis(4-amino-3,5-dimethylcyclohexyl)methane and mixtures thereof; and (b) at least one dimeric fatty acid having 36 carbon atoms; and (c) at least one aromatic dicarboxylic acid selected from the group consisting of isophthalic acid, terephthalic acid, and mixtures thereof; and optionally (d) at least one aliphatic dicarboxylic acid selected from the group consisting of dodecane-1,12-dioic acid, tetradecane-1,14-dioic acid, octadecane-1,18-dioic acid, and mixtures thereof.

7. The microwave-resistant moulding according to claim 1, wherein the at least one amorphous or microcrystalline copolyamide (A) is selected from the group consisting of PA TMDCI/TMDCT/TMDC12/TMDC36, PA TMDCI/TMDCT/TMDC9/TMDC36, PA TMDCI/TMDC12/TMDC36, PA TMDCI/TMDC13/TMDC36, PA TMDCI/TMDC11/TMDC36, PA TMDCI/TMDC12/TMDCCHD/TMDC36, PA TMDCI/TMDC36, PA TMDCI/TMDC44, and mixtures thereof, where TMDC may be wholly or partly replaced by MACM.

8. The microwave-resistant moulding according to claim 1, wherein the at least one amorphous or microcrystalline copolyamide (A) comprises at least one aliphatic dicarboxylic acid as further monomer (d).

9. The microwave-resistant moulding according to claim 1, wherein the at least one amorphous or microcrystalline copolyamide (A) has a light transmittance, measured according to ASTM D 1003-13 (2013) on a plaque of thickness 2 mm produced therefrom, of at least 75%.

10. A microwave-resistant moulding according to claim 1 further including one or more additives selected from the group consisting of inorganic and organic stabilizers, anti-ozonants and light stabilizers, condensation catalysts, chain regulators, lubricants, demoulding agents, separating agents, chain-extending additives, dyes, markers, inorganic pigments, organic pigments, optical brighteners, natural sheet silicate, synthetic sheet silicate, and nanoscale fillers having a maximum particle size of 100 nm.

11. The microwave-resistant moulding according to claim 1, wherein the microwave-resistant moulding compound contains 90% to 100% by weight of the at least one amorphous or microcrystalline copolyamide (A) and 0% to 10% by weight of additives (B), wherein (A) and (B) add up to 100% by weight.

12. The microwave-resistant moulding according to claim 1, which has a wall thickness in the range from 0.05 to 5.0 mm.

13. A method for producing a microwave-resistant moulding according to claim 1, comprising moulding a compound containing 90% to 100% by weight of the at least one amorphous or microcrystalline copolyamide (A) and 0% to 10% by weight of additives (B), wherein (A) and (B) add up to 100% by weight.

14. A microwave-resistant moulding comprising a microwave-resistant moulding compound comprising at least one microcrystalline copolyamide (A) comprising at least the following monomers:

(a) at least one cycloaliphatic diamine;

(b) 1.5 to 4.4 mol % of at least one dimeric fatty acid; and (c) at least one aromatic dicarboxylic acid; and optionally 0 to 30 mol % of aliphatic dicarboxylic acid (d);

wherein the proportions of all of the monomers add up to 100 mol %, and which has a glass transition temperature of at least 155° C. and a dielectric loss factor tan δ of not more than $8.30 \times 10^{-3}$;

wherein the microwave-resistant moulding is selected from the group consisting of dishware, dishes, pots, cups, beakers, plates, lids, sauce boats, covering trays, undertrays, and serving trays.

15. The microwave-resistant moulding according to claim 14, wherein the glass transition temperature of the at least one microcrystalline copolyamide (A) is at least 170° C.

16. The microwave-resistant moulding according to claim 14, wherein the dielectric loss factor tan δ of the at least one microcrystalline copolyamide (A) is not more than $8.0 \times 10^{-3}$.

17. The microwave-resistant moulding according to claim 14, wherein the at least one microcrystalline copolyamide (A) contains at least the following monomers:

(a) at least one cycloaliphatic diamine component selected from the group consisting of bis(4-amino-3-methylcyclohexyl)methane, bis(4-aminocyclohexyl)methane, bis(4-amino-3-ethylcyclohexyl)methane, bis(4-amino-3,5-dimethylcyclohexyl)methane, norbornane-2,6-diamine or 2,6-bis(aminomethyl)norbornane, 1,3-diaminocyclohexane, 1,4-diaminocyclohexane, isophoronediamine, 1,3-bis(aminomethyl)cyclohexane, 1,4-bis(aminomethyl) cyclohexane, 2,2-(4,4'-diaminodicyclohexyl)propane and mixtures thereof; and (b) at least one dimeric fatty acid selected from the group consisting of dimeric fatty acids having 36 or 44 carbon atoms and mixtures thereof; and (c) at least one aromatic dicarboxylic acid selected from the group consisting of isophthalic acid, terephthalic acid, naphthalenedicarboxylic acid, and mixtures thereof and optionally (d) at least one aliphatic dicarboxylic acid selected from the group consisting of hexane-1,6-dioic acid, nonane-1,9-dioic acid, decane-1,10-dioic acid, undecane-1,11-dioic acid, dodecane-1,12-dioic acid, tridecane-1,13-dioic acid, tetradecane-1,14-dioic acid, octadecane-1,18-dioic acid, cyclohexane-1,3-dicarboxylic acid, cyclohexane-1,4-dicarboxylic acid, and mixtures thereof.

18. The microwave-resistant moulding according to claim 14, wherein the at least one microcrystalline copolyamide (A) contains at least the following monomers:

(a) at least one cycloaliphatic diamine component selected from the group consisting of bis(4-amino-3-methylcyclohexyl)methane, bis(4-aminocyclohexyl)methane, bis(4-amino-3,5-dimethylcyclohexyl)methane and mixtures thereof and (b) at least one dimeric fatty acid having 36 carbon atoms; and
(c) at least one aromatic dicarboxylic acid selected from the group consisting of isophthalic acid, terephthalic acid, and mixtures thereof; and optionally
(d) at least one aliphatic dicarboxylic acid selected from the group consisting of dodecane-1,12-dioic acid, tetradecane-1,14-dioic acid, octadecane-1,18-dioic acid, and mixtures thereof.

19. The microwave-resistant moulding according to claim 14, wherein the at least one microcrystalline copolyamide (A) is selected from the group consisting of PA TMDCI/TMDCT/TMDC12/TMDC36, PA TMDCI/TMDCT/TMDC9/TMDC36, PA TMDCI/ TMDC12/TMDC36, PA TMDCI/TMDC13/TMDC36, PA TMDCI/TMDC11/TMDC36, PA TMDCI/TMDC12/TMDCCHD/TMDC36, PA TMDCI/TMDC36, PA TMDCI/TMDC44, and mixtures thereof, where TMDC is wholly or partly replaced by MACM.

20. The microwave-resistant moulding according to claim 14, wherein the at least one microcrystalline copolyamide (A) comprises at least one aliphatic dicarboxylic acid as further monomer (d).

* * * * *